United States Patent
Arima et al.

[15] 3,687,926
[45] Aug. 29, 1972

[54] SURFACTIN

[72] Inventors: Kei Arima; Gakuzo Tamura, both of Tokyo; Atsushi Kakinuma, Kyoto, all of Japan

[73] Assignee: Takeda Chemical Industries, Ltd., Osaka, Japan

[22] Filed: June 1, 1970

[21] Appl. No.: 42,122

Related U.S. Application Data

[63] Continuation-in-part of Ser. No. 769,231, Oct. 21, 1968, abandoned.

[30] Foreign Application Priority Data

Oct. 21, 1967 Japan ..................... 42/67735

[52] U.S. Cl. ............................. 260/112.5, 195/80
[51] Int. Cl. .................. C07c 103/52, A61k 21/00
[58] Field of Search .............. 260/112.5; 195/80

[56] References Cited

OTHER PUBLICATIONS

Derwent Farmdoc No. 37,214, Abstracting patent 68,15030, Published 4/23/69.

*Primary Examiner*—Stanley J. Friedman
*Attorney*—Wenderoth, Lind and Ponack, E. F. Wenderoth, John E. Lind, V. M. Creedon and John T. Miller

[57] ABSTRACT

Surfactin, which especially is useful for treating or preventing hypercholesterolemia, but is also useful in inhibiting loss of activity of various active substances, etc., is prepared by culturing a Surfactin-producing strain belonging to the genus Bacillus in a culture medium containing assimilable carbon sources and digestible nitrogen sources under aerobic conditions until Surfactin is substantially accumulated in the culture broth; and recovering the accumulated Surfactin therefrom.

2 Claims, 1 Drawing Figure

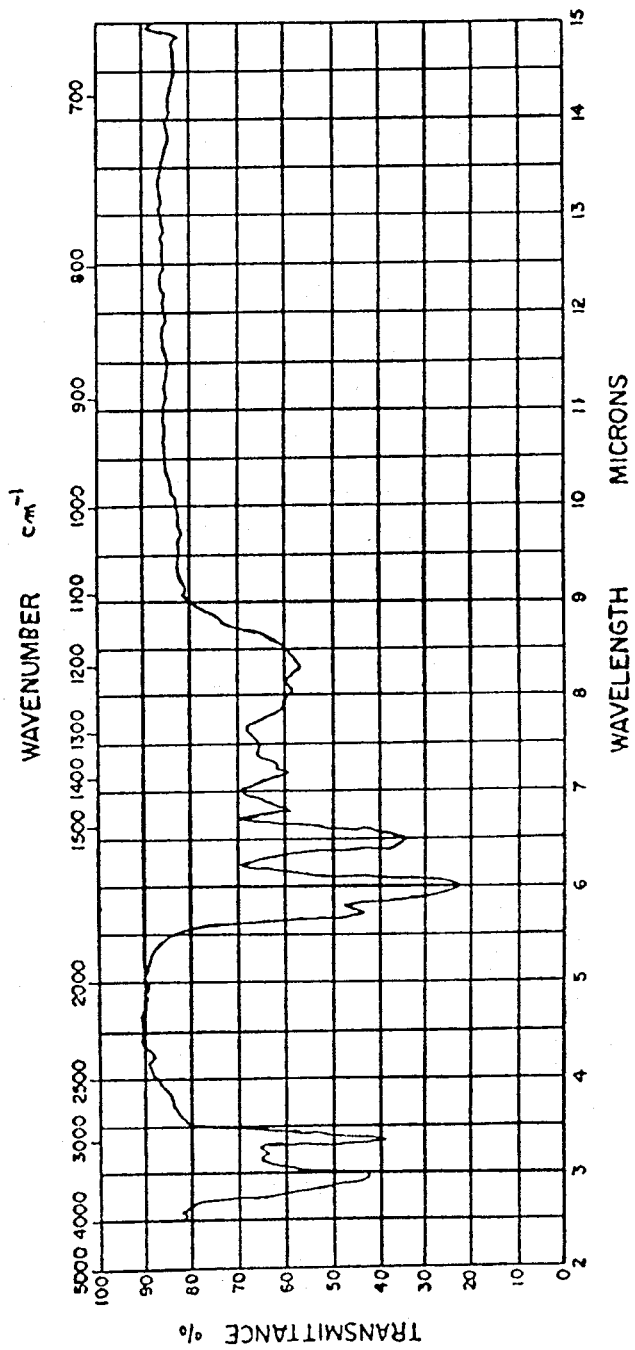

SURFACTIN

This application is a continuation-in-part of Ser. No. 769,231, filed Oct. 21, 1968, now abandoned.

This invention relates to a novel and physiologically active peptidolipid, named Surfactin, and the production thereof.

The invention is based on the following findings:

1. that the present inventors have found certain microorganisms capable of producing a novel physiologically active substance;
2. that the said microorganisms belong to the genus Bacillus;
3. that the physiologically active substance is accumulated in a medium in which the microorganisms are cultured;
4. that so-accumulated substance can be recovered in a desired purity from the culture broth by per se conventional means; and
5. that the substance has an unusually wide variety of physiological activities.

The novel substance has been designated as Surfactin, the structural formula of which has been determined as

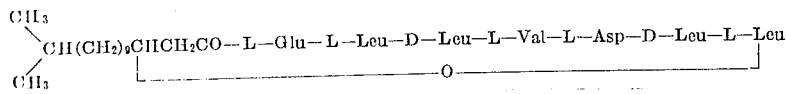

The main object of the present invention is to provide Surfactin.

Another object of the present invention is to provide a method for producing Surfactin.

These objects of this invention are realized by incubating a Surfactin-producing microorganism belonging to the genus Bacillus in a medium containing assimilable carbon sources, digestible nitrogen sources and other nutrients, and recovering Surfactin therefrom.

The microorganisms, which we have found to be particularly efficient, are those strains belonging to *Bacillus subtilis*, cultures of which have been deposited at American Type Culture Collection, Rockville, Maryland, under accession numbers ATCC 21331 and ATCC 21332.

The microbiological properties of these strains are not generally fixed and there are many mutants and variants of the Surfactin-producing microorganisms. Among these organisms, regardless of whether the variation is caused naturally or artificially, for example, with X-ray, ultraviolet-ray, or by the action of chemical reagents such as nitrogen mustard, any one can be employed in the method of the present invention, as long as it produces Surfactin.

The composition of the medium is optional as long as the Surfactin-producing microorganism can grow thereon. Thus, it may contain, as carbon sources, glucose, glycerin, starch, sucrose, etc., and as nitrogen sources, such organic or inorganic nitrogen-containing materials as peptone, meat extract, yeast extract, soybean cake, corn steep liquor, urea, ammonium salts, nitrates and the like.

Such inorganic salts as various phosphates, magnesium sulfate and sodium chloride may also be incorporated into the medium as desired.

In addition, for the purpose of promoting the growth of the microorganism, various vitamins as well as nucleic acids and their related compounds may be added to the medium.

Depending upon the cultural methods and conditions, there may be cases in which the addition of defoaming agents such as silicone resin, soybean oil, etc. is favorable for an increased accumulation of Surfactin.

The medium may be either solid or liquid, but it is generally more preferable to employ a liquid medium under shaking or aeration.

Cultural conditions, such as incubation temperature, incubation time, the pH of the medium, etc., is selected and adjusted so that the output of Surfactin is maximal.

In many instances, however, it will be good to carry out aerobic cultivation at 20°–40° C. at least for about 10 hours, with the medium maintained at pH 6.0–9.0 throughout the cultivation period.

Surfactin is produced in the culture of a Surfactin-producing microorganism.

Thus-produced Surfactin is recovered from the culture broth of the Surfactin-producing microorganism by any of the per se conventional means for the recovery of microbial metabolites in a desired purity.

When a liquid medium is employed, Surfactin is found mostly in the liquid phase; therefore, it is expedient to remove the cells by filtration or centrifugation and then to isolate Surfactin from the filtrate or supernatant fluid as the case may be.

However, Surfactin can be directly isolated from the culture broth without prior removal of the cells.

Separation and purification of Surfactin from the culture can be easily performed by a suitable combination of various available means which take advantage of the physico-chemical properties of Surfactin. By way of example, such means are available as sedimentation of the end product with an inorganic acid, e.g. sulfuric acid or hydrochloric acid, or with a divalent metal compound, e.g. calcium; sedimentation with 50 percent saturation of ammonium sulfate; extraction of the end product with an organic solvent which is sparingly miscible with water, e.g. ether or ethyl acetate; solubilization of the end product with a solvent of a high polarity e.g. acetone or alcohol; removal of impurities with a solvent with a low polarity, e.g. petroleum ether or hexane; gel filtration, using e.g. dextram beads (commercially available as Sephadex); ion-exchange chromatography on an ion exchanger such as diethylaminoethyl cellulose or diethylaminoethyl-Sephadex; absorption chromatography with e.g. activated carbon, silica, etc., and removal of impurities by dialysis with a cellophane diaphragm.

By using a suitable combination of the aforementioned means, Surfactin can be isolated from the culture in a crystalline form. Physical and chemical properties of Surfactin thus obtained are as follows:

PHYSICO-CHEMICAL PROPERTIES:

1. Color and shape of crystals: White needles.
2. Melting point of crystals: 137°–140° C.
3. Elemental analysis: C : 60.5 ± 1.0%, H : 9.0 ± 0.5, N : 9.3 ± 0.5 S and P undetected.
4. Molecular weight: 1050 ± 100 (when measured by vapor pressure method in acetone).

5. Specific rotation: $[\alpha]_D^{27°} = +40° \pm 4°$ (chloroform, 1%); $-39° \pm 4°$ (methanol, 1%).

6. Ultraviolet absorption:
There is no significant maximum absorption between 230 and 400 millimicrons.

7. Infrared absorption of crystals from acetone-water:
Shown in FIG. 1. The significant absorption bands in KBr disc are as follows: (wave length measured in microns): 2.97, 3.34, 3.37, 5.74, 6.04, 6.51, 6.80 and 7.20.

8. Components: On hydrolysis in 6N-hydrochloric acid at 110° C. for 20 hours, L-aspartic acid, L-glutamic acid, L-valine, L-leucine and D-leucine and detected in the ratio of 1 : 1 : 1 : 2 : 2. At the same time 24–25 percent of original crystals is liberated as yellow-brown oily substance which is insoluble in hydrochloric acid and soluble in ether or petroleum ether. The oily substance derives from one mol of a fatty acid moiety per mol of Surfactin.

9. Color reactions: Negative to ninhydrin and positive to biuret reactions.

10. Solubility: Insoluble in water and mineral acids, soluble in alkaline water, acetone, methanol, ethanol, n-propanol, i-propanol, n-butanol, i-butanol, t-butanol, ethyl acetate, chloroform, methylene chloride, dioxane, benzene, tetrahydrofuran, dimethylformamide and glacial acetic acid. Insoluble or sparingly soluble in carbon tetrachloride, petroleum ether, ligroin, petroleum benzin, hexane and cyclohexane. Soluble in ether but gradually precipitates, becoming sometimes a gel. Precipitated from an aqueous alkaline solution with 50 percent saturation of ammonium sulfate or on addition of a divalent metal compound, e.g. cadmium, copper, zinc, iron, cobalt, nickel, manganese, calcium, magnesium or mercury.

11. Stability: Remains substantially unchanged on standing at pH 7 to 9 at 120° C. for 30 minutes.

12. Ultracentrifugal pattern when dissolved in carbonate buffer (0.1M, pH 9.0) and ultracentrifuged in a synthetic boundary cell, sedimented as a single peak. Sedimentation constant as calculated from the sedimentation velocity of the peak is about 1 S.

13. Gel-filtration on a Sephadex column: When dissolved in carbonate buffer (0.1M, pH 9.0) and applied on a Sephadex column, passes through, contained in the front fraction.

14. Dialysis: Not dialyzed through a cellophane diaphragm.

Various physiological activities of Surfactin will hereinafter be mentioned in detail.

1. Inhibition of the fibrinogen-thrombin reaction:

Fibrinogen, a plasma protein which plays a dominant role in the coagulation of blood, is converted into gelatinous fibrin under the enzymatic action of thrombin. While the presence of this reaction system is of vital important to a living organism, an overactivity of this reaction system leads to serious symptoms such as thrombosis or embolism. Surfactin inhibits the thrombin-catalyzed formation of fibrin gels and solubilizes the fibrin gels once formed.

TABLE 1

| Surfactin content, μg/ml. | Coagulation time, sec. |
|---|---|
| 0 | 20 |
| 10 | 26 |
| 25 | 37 |
| 50 | 54 |
| 75 | 72 |
| 100 | 95 |
| 150 | 130–135 |
| 200 | 170–190 |

(Note) Surfactin is added in a varying concentration to 0.02M tris-buffer (tris(hydroxymethyl)aminomethane buffer pH 7.4) containing 0.145 M sodium chloride and 0.5 percent (final concentration) of fibrinogen, and 5 units (Japanese Pharmacopeia unit)/ml (final concentration) of the thrombin is added. The coagulation time is measured at 37° C.

2. Surfactin specifically inhibits the stationary growth in bouillon or microorganisms belonging to the genus Mycobacterium.

The minimal inhibitory concentrations of Surfactin against various strains of bacteria under the growth conditions mentioned above are set forth in Table 2.

TABLE 2

| Strain | Minimal inhibitory concentration, μg/ml. |
|---|---|
| Bacillus subtilis IAM-1026 | >500 |
| Staphylococcus aureus IAM-1011 | >500 |
| Escherichia coli B | >500 |
| Escherichia coli K-12 | >500 |
| Proteus vulgaris IFO-3045 | >500 |
| Pseudomonas aeruginosa IAM-1215 | >500 |
| Serratia marcescens IAM-1023 | >500 |
| Mycobacterium avium IFO-3082 | 10 |
| Mycobacterium phlei IFO-3158 | 5 |
| Mycobacterium smegmatis IFO-3083 | 10 |
| Mycobacterium 607 SM-F | 5 |

(Note) Measured by liquid dilution method in bouillon.

3. Surfactin does not inhibit growth of *Trichophyton mentagrophytes*, a pathogenic fungus responsible for dermatophytosis or athlete's foot, but when used together with known antifungal agents such as pyrrolnitrin which is a microbially produced antifungal agent, Surfactin increases their antifungal activities against *Trichophyton mentagrophytes* and, at the same time, prevent diminution of their antifungal activities in the presence of serum. Table 3 shows the cooperative effect of Surfactin with pyrrolnitrin.

Practically, however, the addition of Surfactin between about 0.5 and about 5 mg. to an antifungal ointment is effective enough to increase the activity of the latter which, for example, includes 5 mg. of pyrrolnitrin, 5 mg. of benzalconium chloride, 20 mg. of salicylic acid, 200 mg. of diethyl sebacate, etc.

TABLE 3

Effect of Surfactin on antifungal activity of pyrrolnitrin

| | Additive | Minimal inhibitory concentration, μg/ml. |
|---|---|---|
| pyrrolnitrin | no addition | 1.56 |
| | Surfactin, 500 μg/ml. | 0.39 |
| | Serum, 10% | 12.5 |
| | Serum, 10% Surfactin, 500 μg/ml. | 1.56 |

Note: Test microorganism: *Trichophyton mentagrophytes*. Measured by agar dilution method on Sabouraud's medium. When used alone, Surfactin has no effect even at 500 μg/ml.

Further, various enzymes, antibiotics and other physiologically active substances are known to decrease in activity in the presence of serum, but the prevention of such inactivation by the concomitant use of Surfactin opens a wide applicability of the substance in the field of medicine.

4. Surfactin has a strong surface active property. Table 4 shows the surface tension-lowering activity of Surfactin as measured by the drop weight method using a stalagometer. Table 4 shows that Surfactin has a by far stronger surface active property than that of sodium lauryl sulfate which is known to be a powerful surfactant. No surface active agent as effective as Surfactin which has its origin in the microbial world has ever been described.

TABLE 4

| Sample | | Surface tension, dyne/cm |
|---|---|---|
| Distiller water | | 71.98 |
| 0.1M sodium bicarbonate solution | | 71.57 |
| Sodium lauryl sulfate | 0.005%* | 56.56 |
| | 0.05%* | 31.25 |
| Surfactin | 0.005%* | 27.90 |
| | 0.05%* | 27.00 |

(Note) *Each sample in 0.1M sodium bicarbonate solution. Measured at 25°C. by the drop weight method.

5. The acute toxicity of Surfactin in mice:
$LD_{50}$ (intramuscular): 420 mg/kg. (milligrams per kilogram)
$LD_{50}$ (intravenous): 105 mg/kg.
$LD_{50}$ (intraperitoneal): 200 mg/kg.
$LD_{50}$ (per os): >4 g/kg.

As is clear from the foregoing, Surfactin, solely or in cooperation with other compounds, is very useful, for example, as surfactant, stabilizing agent for medicine, medicine for thrombosis, embolism, inflammation, etc., so that Surfactin finds applications in such various fields as medicine, pharmaceutical science, biology and chemistry as well as in their related fields.

It is particularly to be noted that the administration of Surfactin to hypercholosterolemized rats at a daily dose level of 50 to 100 milligrams per kilogram of the body weight results in remarkably lowering the total cholesterol level in plasma (P <1%) and in liver (P <0.1%) and the depression of the ratio of total cholesterol/phospholipids in plasma (P <1%) as well as in ameliorating liver lipid pattern. (P: Probability of significance)

Due to the significant anti-cholesteremic activities and the low toxicity, Surfactin is also used for treating or preventing hypercholesterolemia, and for this purpose the oral daily dose is usually from about 0.5 gram to about 3 grams, advantageously about 1 to 1.5 grams, for a human adult.

Surfactin can be administered solely or in combination with a pharmaceutically acceptable carrier, or can be administered together with other medicinal compound or compounds with or without any other pharmaceutically acceptable carrier. Administration forms are such as powders, tablets, capsules, syrups, solutions, etc. for oral use. The choice of carrier is determined by the preferred form of administration and standard pharmaceutical practice.

Percentages in the following examples are on the weight/volume basis.

EXAMPLE 1

*Bacillus subtilis* (ATCC 21331), precultivated on a slant of bouillon medium containing 1 percent peptone, 0.7 percent meat extract and 0.3 percent sodium chloride at 30° C. for 24 hours, is inoculated into 10 ml. of a bouillon medium in a test tube, and cultivated under shaking at 30° C. for 12 hours. The culture is then transferred to 1 liter of a bouillon medium in a 5 liter conical flask and further cultivated on a rotary shaker at 30° C. for 20 hours. Twenty liters of the combined culture, collected from 20 such flasks, are adjusted to pH 2 with hydrochloric acid and the resulting precipitate is collected by filtration and suspended in about 1 liter of water. The suspension is adjusted to pH 9 under stirring and heating.

Then, the suspension is allowed to stand at room temperature (about 15° to about 30° C.) for about 1 hour, and centrifuged to remove the cells.

Hydrochloric acid is added to the supernatant fluid, whereupon precipitates are formed. The precipitates are extracted with ether, and the extract is concentrated to dryness. The residue is dissolved in about 1 liter of water at pH 9. After the insolubles are filtered off, the filtrate is dialyzed in a cellophane diagram against running water for 2 days. This operation is followed by another dialysis overnight against 0.5 M acetate buffer solution (pH 4) and the resulting sediment is centrifugally collected. The cycle of alkali dissolution, acid sedimentation and ether extraction is carried out two times, and the ether solution is concentrated to dryness. The residue is dissolved in acetone, and the insolubles are filtered off. To the acetone solution is added an equal volume of water to cause precipitates which are centrifugally collected and washed with a 50:50 mixture of acetone and water. Then another cycle of alkali dissolution, acid sedimentation and ether extraction is carried out.

The extract is concentrated to dryness, and the residue is dissolved in carbonate buffer solution (0.1M, pH 9) and the solution is treated on a Sephadex column. The active fractions are collected.

The active fractions are further subjected to acid sedimentation, ether extraction and concentration, and the resulting concentrate is washed repeatedly with petroleum ether. It is then dissolved in ether and the solution is filled into a container, which is sealed and left standing at room temperature, whereupon sediments are formed. Two days later, the sediments are collected by filtration and washed with ether to yield 870 mg. of white powdery Surfactin, melting at 136°–140° C.

EXAMPLE 2

*Bacillus subtilis* (ATCC 21332) is cultivated in the same manner as in Example 1, and the cells are centrifugally removed from the culture solution. Two liters of the resulting filtrate (pH 8.8) is treated with ethyl acetate, and the ethyl acetate layer is discarded. The aqueous layer is adjusted to pH 2 with hydrochloric acid and the resulting sediments are dissolved in ether. After a cycle of procedures: —concentration, alkali dissolution, acid precipitation, centrifugal separation and alkali dissolution—, a solution of calcium chloride is added to the solution until no more sedimentation occurs, whereupon the sediments are collected by filtration and washed with ethyl acetate. The sediments are then suspended to 0.01N-hydrochloric acid and the suspension is allowed to stand for a while.

Then the suspension is shaken with ether and the ether-layer is concentrated. The concentrate is subjected to another cycle of alkali dissolution, addition of calcium chloride, filtration, acid ether extraction and concentration. The concentrate is then dissolved in a carbonate buffer solution (0.1M, pH 9) and the solution is allowed to pass on a Sephadex column. The active fractions are collected, and hydrochloric acid is added to the fraction. The resulting sediments are extracted with ether, and the extract is dissolved in alkaline water (pH 10). After another cycle of sedimentation with hydrochloric acid, the resulting sediments are collected by filtation and thoroughly washed with 0.01N-hydrochloric acid, followed by dissolution in ether. The insolubles are filtered off, and the ether fraction is concentrated, acetone is added to the concentrate, and after the insolubles are filtered off, the solution is concentrated. The concentrate is allowed to pass on a column of acetone-treated Sephadex, and the active fractions are collected.

Water is added in an amount twice that of acetone to cause a little turbidity. The mixture is allowed to stand in a refrigerator at 5° C. Within two months, Surfactin crystallized. The crystals are washed with acetone-water (1:2), whereupon 40 mg. of needles of Surfactin is obtained.

Two hundred mg. of the powder obtained in Example 1 is dissolved in 12 ml. of acetone, followed by addition of 8 ml. of water and the mixture is allowed to stand in a refrigerator at 5° C. for a while. When a little turbidity is noted in the mixture, the above-obtained needles are added thereto as seed crystals, followed by being allowed to stand overnight, whereby white needles separate out. Recrystallization from acetone-water, gives 140 mg. of Surfactin, melting at 137° to 140° C.

Elementary Analysis: C, 59.55; H, 9.00; N, 9.12.

EXAMPLE 3

Bacillus subtilis (ATCC 21332) is cultivated on an increasing scale to prepare 500 liters of a culture preparation.

1. Slant culture
   Medium: 1 percent peptone, 1 percent meat extract, 0.5 percent sodium chloride, 1.5 percent agar.
   Temperature: 30° C.
   Period: 24 hours.
2. Flask culture (a couple of conical flasks)
   Medium: 1 percent peptone, 1 percent meat extract, 0.5 percent sodium chloride.
   Flask capacity: 2 liters × 2.
   Liquid amount: 500 ml. × 2.
   Cultural method: Reciprocating shake culture.
   Temperature: 30° C.
   Period: 24 hours.
(3) Seed Culture
   Medium: 1 percent peptone, 1 percent meat extract, 0.5 percent sodium chloride.

Tank capacity: 50 liters.
Liquid amount: 30 liters.
Defoaming agent: Silicone resin (commercially available as TSA 750)
Aeration: 15 liters/min.
Agitation: 280 rotation/min.
Temperature: 30° C.
Period: 24 hours.
(4) Main Culture
   Medium: 1 percent peptone, 1 percent meat extract, 0.5 percent sodium chloride, 1 percent glucose.
   Tank capacity: 1000 liters.
   Liquid amount: 500 liters.
   Defoaming agent: Silicone resin (aforementioned) 0.025 percent
   Aeration: 500 liters/min.
   Agitation: 160 rotation/min.
   Temperature: 30° C.
   Period: 24 hours.

Subsequent to cultivation, the cells are centrifugally removed, whereupon about 490 liters of supernatant fluid (pH 7.6) is obtained. The fluid is treated with 100 liters of ethyl acetate mainly to remove silicone resin. After the separation of ethyl acetate, the aqueous layer is adjusted to pH 2 with sulfuric acid, followed by extraction twice with half a volume each of ethyl acetate.

The combined ethyl acetate solution of about 500 liters is concentrated to 2 liters and the concentrate is treated with 50 g. of active carbon to eliminate colored contaminants. The carbon is removed by filtration with a filter aid and thus-obtained clear filtrate is concentrated to about 1 liter. The concentrate is extracted with about 2 liters of alkaline water (pH 10) to transfer the active substance to the aqueous layer. Calcium chloride is then added to the alkaline solution to make the active substance precipitate completely as calcium salt.

After being collected by centrifugation, the precipitates are suspended in about 500 ml. of water and, by the addition of hydrochloric acid, the suspension is adjusted to pH 2. The suspension is stirred for a while to give calcium-free precipitates.

Then the precipitates are extracted with ether and the ether solution is concentrated. The residue here obtained is dissolved in about 1 liter of acetone and passed through a column packed with 100 ml. of active carbon pretreated with acetone. The column is washed with 1 liter of acetone. The eluate combined with the washing is concentrated to dryness.

These procedures yield 30 g. of Surfactin, as white powder.

The powder is dissolved in about 600 ml. of acetone to which about 400 ml. of water is added to make the solution slightly turbid. To this solution a small quantity of crystal seeds of Surfactin is added and kept standing in a refrigerator for 12 hours, whereby 24 g. of crystalline Surfactin melting at 137° to 140° C. is obtained as white needles.

What is claimed is:

1. A compound of the formula

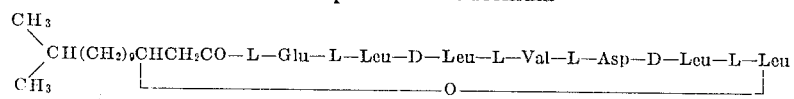

2. A method for preparing a compound of the formula

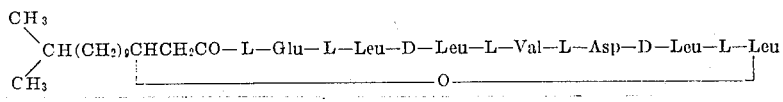

which comprises culturing *Bacillus subtilis* ATCC 21331 or ATCC 21332 in a culture medium containing assimilable carbon sources and digestible nitrogen sources under aerobic conditions at a pH between about 6.0 and about 9.0 and a temperature between about 20° C. and about 40° C. until the compound is substantially accumulated in the culture broth, and recovering the accumulated compound therefrom.

* * * * *